United States Patent Office 2,724,473
Patented Nov. 22, 1955

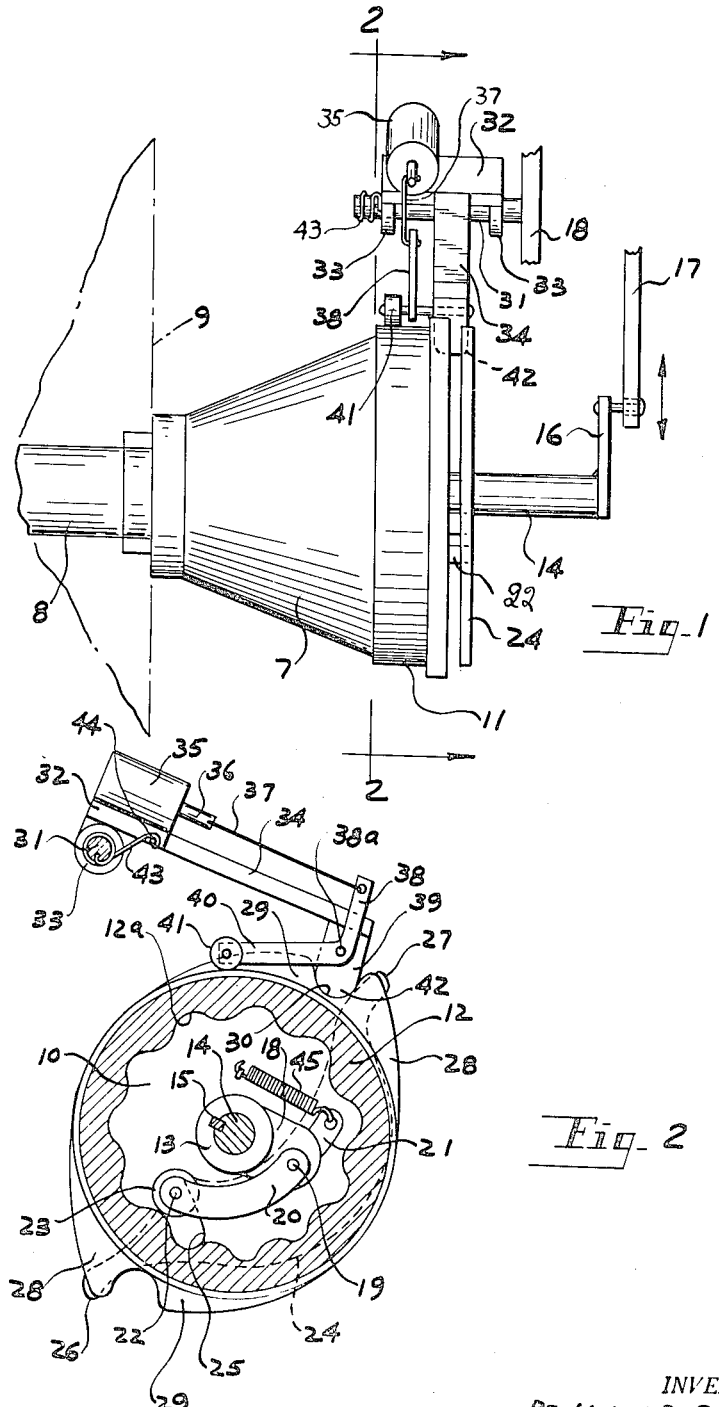

2,724,473

CLUTCH ACTUATOR TRIP

Benjamin D. Stevenson, Flushing, Mich.

Application February 19, 1951, Serial No. 211,684

3 Claims. (Cl. 192—62)

My invention relates to a new and useful improvement in a clutch actuator trip adapted for use on farm implements such as plows, cultivators, drills, and the like. In the use of such implements, the implement is generally mounted on a frame which is supported by traction wheels and the entire structure drawn by a tractor or other suitable source of power. The operator, when desiring to raise or lower the implement, releases a trip which permits the clutch to move to closed or operative position so that a lifting bar is then operated to lift or lower the implement.

It is an object of the present invention to provide an electrically operated mechanism for moving the trip.

Another object of the invention is the provision of a solenoid operated mechanism which will serve to actuate the trip and provide a mechanism which will be simple in structure, economical of manufacture, durable and compact.

Another object of the invention is the provision of a solenoid operated trip whereby the trip may be released through a rocking movement of connected parts.

Other objects will appear hereinafter.

It is recognized that various modifications and changes may be made in the detail of structure illustrated without departing from the invention and it is intended that the present disclosure shall be considered but the preferred embodiment.

Forming a part of this application are drawings in which,

Fig. 1 is a side elevational view of the invention showing it applied.

Fig. 2 is a sectional view taken on line 2—2 of Fig. 1.

In the drawings I have illustrated a clutch housing projecting outwardly from which is a tubular sleeve 8 on which is fixedly mounted a traction wheel 9, so that the sleeve 8 and the housing 7 rotate in unison with the wheel 9. A cup-shaped member embodying a bottom plate 10 and a wall 11 serves as a closure for the open end of the housing 7, the wall 11 embracing the axially directed terminal portion 12 of the housing. Formed in this axially directed terminal portion is a plurality of spaced apart recesses 12a. Formed integral with the base 10 and projecting inwardly therefrom is a hub 13 through which extends the shaft 14 which is keyed to the hub by the key 15 and which projects through the sleeve 8. Fixedly attached to, and radially projecting outwardly from, one end of the shaft 14 is a crank arm 16 which is pivotally connected to one end of the raising bar 17.

Projected outwardly from, and formed integral with, the hub 13 is a lug, or bracket 18, to which is pivotally connected, by means of the pivot pin 19, the arcuate links 20 and 21, the link 21 being longer than the link 20. Pivoted between the ends of the links 20 and 21, by means of the pivot pin 22, is a roller 23.

Positioned exteriorly of this cup-shaped member is a plate 24 having the engagement ends 26 and 27. This plate 24 is pivoted on the pivot 19 and the pivot pin 22 extends through the slot 25 and into the plate 24 so that a rocking of the plate 24 on its pivot pin 19 will also effect a rocking of the links 20 and 21 on the pivot pin 19.

Projected outwardly from periphery of the cup-shaped member are the flanges, or cams, 28 and 29 separated by the notch 30.

A supporting rod 31 extends outwardly from the frame 18. Plate 32 is provided with the lugs 33 through which the rod 31 projects so that this plate 32, which constitutes a bed, is rockably mounted on the rod 31. Extending outwardly from the bed 32 and in fixed relation thereto is an arm 34. A solenoid 35, having the movable core, or plunger 36, is fixedly mounted on the bed 32. This core, or plunger 36, is connected by the rod 37 to one arm 38 of a bell crank, which is pivoted at 38a to the abutment lock 39, which is fixed to and projects outwardly from the end of the arm 34. Carried on the other arm 40 of the bell crank is a roller 41, which engages the periphery on wall 11 of the cup-shaped member. This abutment block 34 is provided with a tapered end 42, which is adapted to engage in the recess 30. A spring 43 is attached at one end to the rod 31 and at its opposite end it is hooked over a pin 44, projecting outwardly from the bed 32. The spring 43 normally maintains the arm 34 rocked downwardly.

A spring 45 is attached at one end to the base 10, and at its opposite end to the link 21, and normally tends to rock the links 20 and 21, so as to bring the roller 23 into engagement with one of the recesses, or pockets 12a. When this roller 23 rests in one of the pockets, or recesses 12a, the shaft 14 will rotate in unison with the housing 7, thus effecting an operation of the lifting bar 17. In this movement of the roller 23 from the position shown in Fig. 2 into one of the recesses, or pockets 12a, the ends 26 and 27 of the plate 24 would have to rock across the recesses 30. This movement of the plate 24 is prevented through engagement with the abutment block 39.

The solenoid 35 is connected to a suitable source of electrical energy, and through the circuit leading to the solenoid there is interposed a switch, preferably the type which is normally spring-pressed to open position, and this switch is accessible to the driver of the tractor or other source of drawing power. When the solenoid is energized, the plunger or core will be drawn inwardly or to the left of Fig. 2, and through the leverage of the bell crank the abutment block will move upwardly out of engagement with the recess 30. This movement is assisted through engagement of members 26 or 27 with the tapered end 42 of the block 39. The roller 23 will then engage in one of the recesses 12a and a rotation of the shaft 14 will be effected. The spring 43 will maintain the block 39 on the periphery of the wall 11, so that as the block 39 rides over the cam, or flange 28, it will drop into the adjacent recess 30, rocking the plate 24 to a position for moving the roller 23 out of the recess 12a.

It is to be noted that in this structure the solenoid, together with its connected parts, all rock on the rod 31. Experience has shown that this method of tripping is most efficient in use and may be easily and quickly effected.

What I claim is:

1. In a device of the class described adapted for use with a structure embodying a rotatable clutch member, having on its periphery at one side thereof, at diametrically opposite points, a recess and a cam flange at opposite sides of said recess; an abutment member engageable in said recess; a supporting rod; a bed rockably mounted on said rod; a supporting arm fixed at one end to said bed and projecting outwardly therefrom, said abutment member being carried on the free end of said arm; a solenoid positioned on said bed; a plunger for said solenoid; a bell crank pivotally mounted intermediate its ends on said abutment member, the end of one arm of said bell crank being engageable with the opposite side of the periphery of said clutch member; and a rod connecting the end of the other arm of said bell crank with said plunger for effecting, through said bell crank, a rocking of said supporting arm for moving said abutment member out of said recess upon energizing of said solenoid.

2. In a device of the class described adapted for use with a structure embodying a rotatable clutch member, having on its periphery at one side thereof, at diametrically opposite points, a recess and a cam flange at opposite sides of said recess; an abutment member engageable in said recess; a supporting rod; a bed rockably mounted on said rod; a supporting arm fixed at one end to said bed and projecting outwardly therefrom, said abutment member being carried on the free end of said arm; a solenoid positioned on said bed; a plunger for said solenoid; a bell crank pivotally mounted intermediate its ends on said abutment member, the end of one arm of said bell crank being engageable with the opposite side of the periphery of said clutch member; and a rod connecting the end of the other arm of said bell crank with said plunger for effecting, through said bell crank, a rocking of said supporting arm for moving said abutment member out of said recess upon energizing of said solenoid; and a spring for normally urging said arm in a direction to retain said abutment member in said recess.

3. In a device of the class described adapted for use with a clutch member, having on its periphery at one side thereof a pair of spaced-apart cam flanges to provide recess between adjacent ends thereof, comprising: a supporting member; a bed; a pair of lugs projecting from said bed, said supporting member projecting through said lugs, said bed being rockably supported on said supporting member; an arm fixed at one end to said bed and projecting outwardly therefrom; an abutment member carried on the free end of said arm and engageable in said recess; a bell crank pivotally mounted on said abutment member and engageable at one end with the opposite side of periphery of said clutch member; a solenoid positioned on said bed; a plunger for said solenoid connected to the opposite end of said bell crank and adapted upon energizing of said solenoid for rocking said bell crank, for moving said abutment member out of said recess.

References Cited in the file of this patent

UNITED STATES PATENTS 2,517,172    Bjerre             Aug. 1, 1950

FOREIGN PATENTS 263,103    Switzerland        Nov. 1, 1949